N. F. RUTHERFORD.
ELECTRICAL SYSTEM.
APPLICATION FILED APR. 11, 1916.

1,238,573.

Patented Aug. 28, 1917.
4 SHEETS—SHEET 1.

Inventor:
Norman F. Rutherford,
by Robert Lushman
Attorneys.

N. F. RUTHERFORD.
ELECTRICAL SYSTEM.
APPLICATION FILED APR. 11, 1916.

1,238,573.

Patented Aug. 28, 1917.
4 SHEETS—SHEET 2.

Inventor:
Norman F. Rutherford,
by Roberts, Roberts & Cushman
Attorneys.

N. F. RUTHERFORD.
ELECTRICAL SYSTEM.
APPLICATION FILED APR. 11, 1916.
1,238,573.
Patented Aug. 28, 1917.
4 SHEETS—SHEET 3.
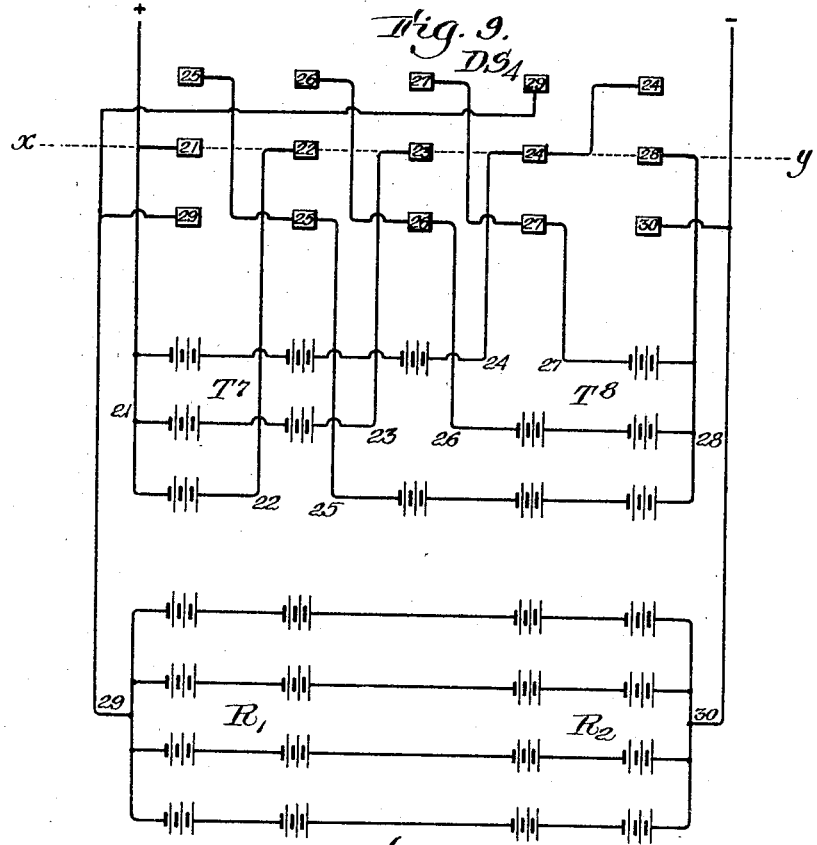
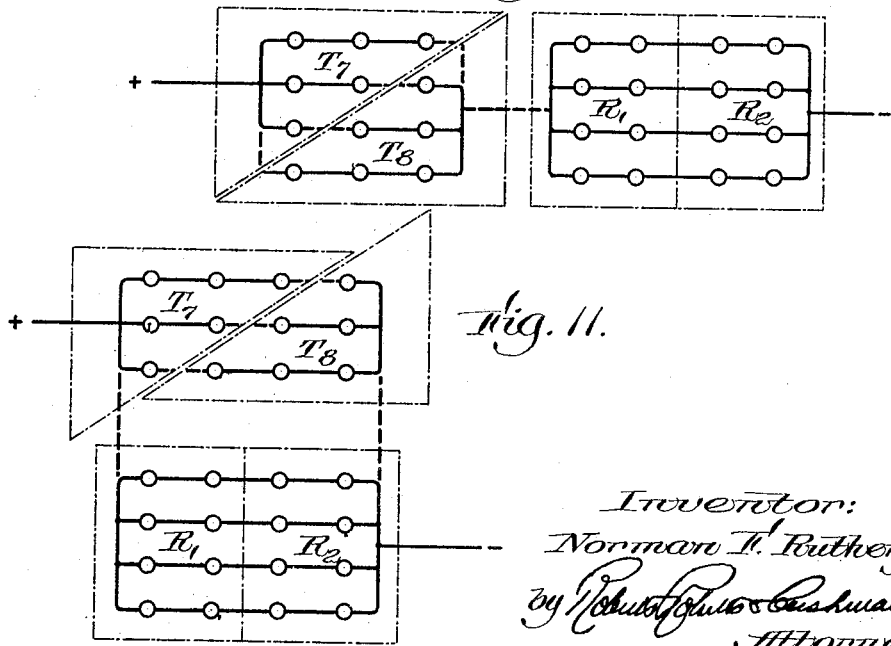
Inventor:
Norman F. Rutherford,
by Roberts, & Cushman
Attorneys.

N. F. RUTHERFORD.
ELECTRICAL SYSTEM.
APPLICATION FILED APR. 11, 1916.

1,238,573.

Patented Aug. 28, 1917.

Inventor:
Norman F. Rutherford,
by Roberts  Roberts  Cushman
Attorneys.

UNITED STATES PATENT OFFICE.

NORMAN F. RUTHERFORD, OF EAST FALMOUTH, MASSACHUSETTS.

ELECTRICAL SYSTEM.

1,238,573.  Specification of Letters Patent.  Patented Aug. 28, 1917.

Application filed April 11, 1916. Serial No. 90,474.

*To all whom it may concern:*

Be it known that I, NORMAN F. RUTHERFORD, a subject of the King of Great Britain, and resident of East Falmouth, in the county of Barnstable and State of Massachusetts, have invented new and useful Improvements in Electrical Systems, of which the following is a specification.

This invention relates to an electrical system so constructed and arranged that a plurality of unique groups of electrical units or elements may be quickly and simply changed from one series-parallel combination to a different series-parallel combination; and in the particular embodiment herein disclosed the invention relates to a secondary battery system in which battery units may be connected in different series-parallel combinations by means of a double-throw switch.

There are many situations where it is desirable to accomplish a quick transposition of electrical elements from one circuit arrangement to another by means which may be operated in a simple manner by persons unskilled in the use of electrical apparatus and in such a manner that the danger of making a false connection is eliminated. In secondary battery systems for isolated plants and the like, for example, it is often desirable at times to connect a group of secondary battery units in a suitable series-parallel combination to supply a certain potential to the working circuit and at other times to connect the units to the charging circuit in a different relation as, for example, with more units in parallel and less units in series, whereby the batteries may be charged more quickly and to a higher potential than when arranged in the manner employed for supplying current to the working circuit.

One object of this invention is to provide a simplified electrical system wherein a group or groups of elements may be changed from one circuit arrangement to another, each arrangement having any desired number of elements in series and parallel, respectively, and preferably wherein each combination is rectangular, that is, so connected as to have the same number of elements in each series sub-group.

Other objects of the invention will be apparent from the following description and accompanying drawings, wherein—

Fig. 9 is a diagrammatic view of another embodiment of my invention;

Figs. 10 and 11 are simplified diagrams of the connection in Fig. 9 with the switch in upper and lower positions respectively;

Figure 1:
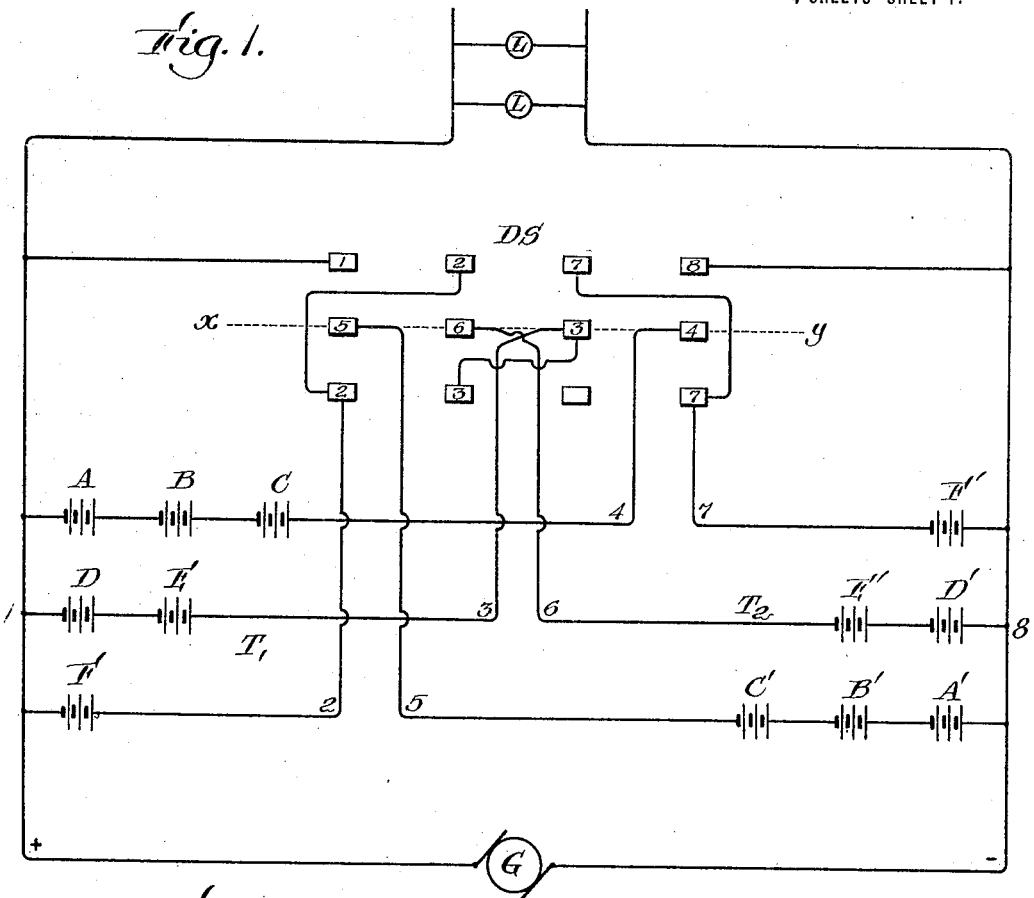
Figure 1 is a diagrammatic illustration of the application of my invention to a secondary battery system.
Figure 4:
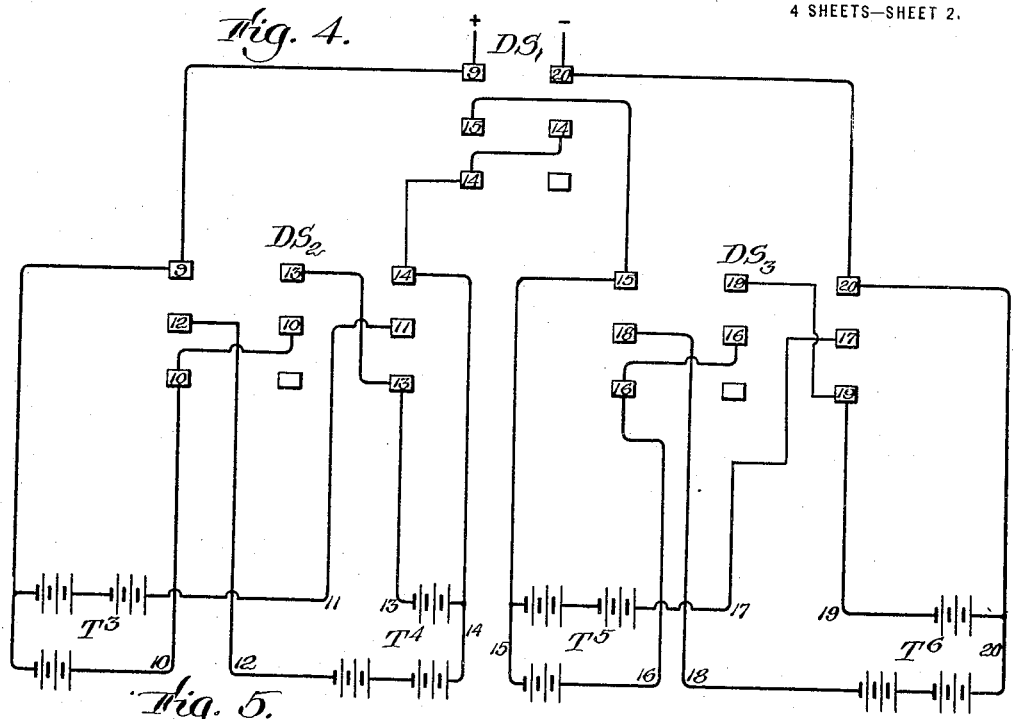
Fig. 4 shows the combination of two arrangements, each similar to that shown in Fig. 1.

In each of the illustrated modifications of the invention it will be noted that I employ a plurality of elements permanently connected together in cuneiform or tapered groups comprising a plurality of sub-groups, each sub-group comprising either one element or a plurality of elements connected in series; and the sub-groups are permanently connected in groups in such a manner that the number of elements in the sub-groups increases in arithmetical progression, the number in the first sub-group being equal to the common difference of the progression. In Fig. 1 two triangular groups $T_1$ and $T_2$ are shown, each group comprising three sub-groups having one, two and three elements, respectively, the common difference being one. In Fig. 4, the sub-groups comprise one and two elements, respectively, the common difference being one. I contemplate using any suitable number of sub-groups and any suitable common difference to give the desired combinations of elements. In Fig. 1 for example, each elemental group A, B, C, A', B', C', etc., might consist of two or more elements in parallel, in which case the common difference would be two or more. Fig. 9 illustrates one manner of associating one or more rectangular groups of elements with the triangular groups to attain certain combinations of elements. The connections to the respective sub-groups are numbered and the switch contacts to which the respective points are connected are similarly numbered.

Figure 2:
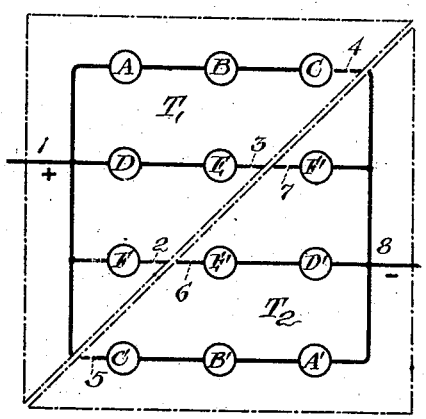
Figs. 2 and 3 are simplified diagrams of the connections in Fig. 1 with the switch in upper and lower positions respectively.
Figure 3:
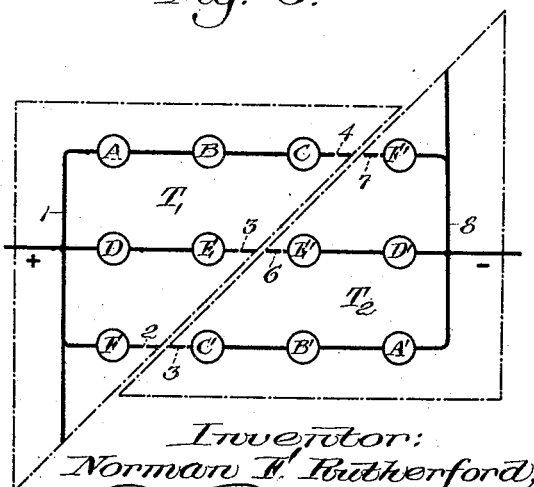

Referring more particularly to Fig. 1, the battery elements are connected in two triangular groups $T_1$ and $T_2$, group $T_1$ comprising elements A to F and group $T_2$ comprising elements A' to F', these groups being connected to a working circuit 1—8 to which is also connected a generator G and a load L. DS is a double-throw switch rotatable about the horizontal axis $x$—$y$ for variably connecting the two triangular groups of battery elements in different series-parallel combinations across the working circuit 1—8. When the switch is in upper position the connections are as follows: The sub-group 1—3 comprising elements D and E, is connected in series with sub-group 7—8 comprising element F'; the sub-group 1—2 comprising element F is connected in series with sub-group 6—8 comprising elements E' and D'; and these two combinations of sub-groups are connected across the working circuit in parallel with each other and in parallel with the sub-groups 1—4 and 5—8, respectively, comprising elements A, B, and C and A', B' and C'. This forms an arrangement as illustrated in Fig. 2 wherein the two triangular groups $T_1$ and $T_2$ are wholly overlapped forming a three-four series-parallel combination. This arrangement may be employed for charging the battery. When the switch is in the lower position the sub-groups 1—2, 1—3 and 1—4 are respectively connected in series with sub-groups 5—8, 6—8 and 7—8, thus affording a four-three series-parallel combination as illustrated in Fig. 3. It will be noted from a comparison of Figs. 2 and 3 that the electrical effect of moving the switch from the upper to the lower position is to shift the triangular groups of elements $T_1$ and $T_2$ from the totally overlapped relation shown in Fig. 2 to the partially overlapped relation shown in Fig. 3.

While the tapered groups of elements need not be triangular in form within the contemplated scope of my invention, the idea of overlapping to different degrees groups having one or more sides tapered in whole or in part to give different series-parallel combinations is a generic feature of my invention, and will be found in each of the specific embodiments herein disclosed.

Figure 5:
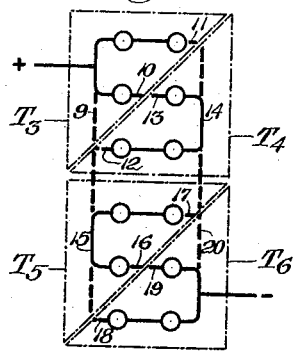
Figs. 5 to 8 are simplified diagrams of the connections in Fig. 4 with the three switches in various positions, Fig. 5 showing the connections with the switches all in upper position, Fig. 6 representing switch $DS_1$ up and $DS_2$ and $DS_3$ down, Fig. 7 representing switch $DS_1$ down and $DS_2$ and $DS_3$ up, and Fig. 8 illustrating the connections when the switches are all in lower position.
Figure 6:
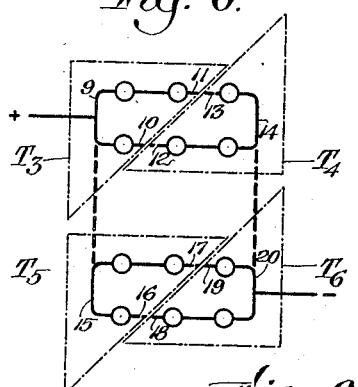
Figure 7:
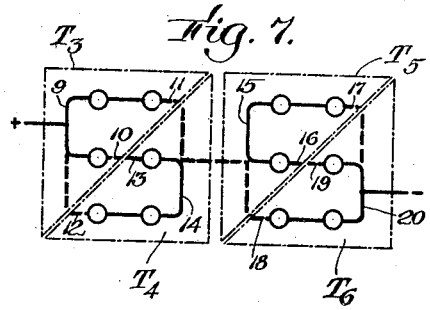
Figure 8:
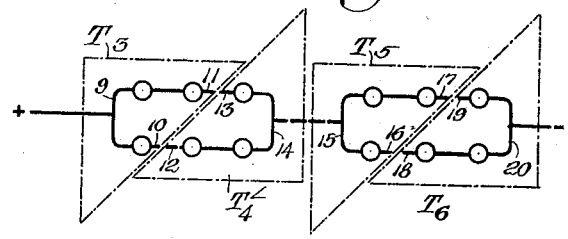

The system shown in Fig. 4 is a combination of two systems similar to that shown in Fig. 1, and comprises four triangular groups of elements $T_3$, $T_4$, $T_5$ and $T_6$, two double-throw switches $DS_2$ and $DS_3$ for controlling the respective groups, and an additional double-throw switch $DS_1$ for connecting the two groups in parallel in the upper position and in series in the lower position. With this arrangement four different symmetrical series-parallel combinations of the elements may be had. The switches $DS_2$ and $DS_3$ connect their respective groups into a two-three series-parallel combination when in the upper position, and into a three-two series-parallel combination when in the lower position. Hence, with each of the three switches in upper position, the elements are connected into a two-six series-parallel combination as shown in Fig. 5; with $DS_1$ up and $DS_2$ and $DS_3$ down, into a three-four series-parallel combination as in Fig. 6; with $DS_1$ down and $DS_2$ and $DS_3$ up, into a four-three series-parallel combination as in Fig. 7; and with each of the switches down, the elements are connected into a six-two series-parallel combination as shown in Fig. 8. This arrangement illustrates one way in which more than two rectangular series-parallel connections may be had and in which a greater range of variation between the respective numbers of elements in series and in parallel may be obtained.

The embodiment of my invention illustrated in Fig. 9 comprises two triangular groups of elements $T_7$ and $T_8$, a group $R_1$—$R_2$, which may be considered a single rectangular group or a plurality of rectangular groups, and a single double-throw switch $DS_4$ for controlling all of the elements. With the switch in upper position (Fig. 10) the triangular groups $T_7$ and $T_8$ are wholly overlapped, affording a rectangular arrangement of three elements in series and four elements in parallel, this combination being connected in series with the rectangular group of elements $R_1$—$R_2$, resulting in a total rectangular group of seven elements in series and four elements in parallel. With the switch in lower position (Fig. 11) the triangular groups are partially overlapped forming a rectangular arrangement of four in series and three in parallel, this combination being connected in parallel with the rectangular group $R_1$—$R_2$, giving a total rectangular group of four in series and seven in parallel. This illustrates another method of making a comparatively large change in the ratio of elements in series to elements in parallel and by means of a single double-throw switch.

In combining two triangular groups of elements arranged in arithmetical progression having a common difference of one and terminating in a single element, as in Figs. 1, 4 and 9, it will be noted that the maximum number of elements in series in the partially lapped combination, is equal to the maximum number in parallel in the totally lapped combination. Likewise, with this particular form of progression, the two minimum numbers are equal. For example, in Figs. 1 and 9 the minima and maxima are respectively three and four. In Fig. 4 the minima and maxima are two and three, respectively. But, when the arithmetical progressions forming the triangular groups have a common difference of more than one, or $n+1$, terminating in a sub-group having $n+1$ elements in series, the minimum and maximum numbers of elements in series and parallel, respectively, obtained by wholly and partially lapping the groups are not equal. If, in the system illustrated in Fig. 4, for example, each element of the respective triangular groups comprised two units in parallel, the common difference would be two and the system would afford a two-six series-parallel combination and a three-four series-parallel combination.

These minimum and maximum numbers are useful in determining the proper number of elements to be employed in series and parallel, respectively, in forming a rectangular group of elements, which when associated with triangular groups as in Fig. 9, will give rectangular total-combinations. To attain the desired rectangular total-combinations, the rectangular group may have elements in series and parallel respectively equal in number either to the minimum or the maximum number of elements in series and parallel obtainable by combining the triangular groups. For example, the rectangular group in Fig. 9 has four elements in series and parallel, respectively, which is equal to the maximum number of elements in series and parallel, respectively, obtainable by combining the two triangular groups as explained above. The rectangular group in Fig. 9 might also have three elements in series and parallel, respectively, which is the minimum number of elements in series and parallel, respectively, obtainable by combining the triangular groups. It will be noted that in systems where the common difference of the arithmetical progression is one, the rectangular groups are square, as in Fig. 9, that is, they have the same number of elements in series as in parallel. However, where the common difference is $n+1$, the rectangular groups are not square. For example, with a system similar to that shown in Fig. 4, but in which $n$ is equal to one and $n+1$ is equal to two, the rectangular group should comprise either a two-four series-parallel combination or a three-six series-parallel combination, two and four being the minimum series and parallel numbers, respectively, and three and six being the maximum series and parallel numbers, respectively, afforded by the two triangular groups.

Figure 12:
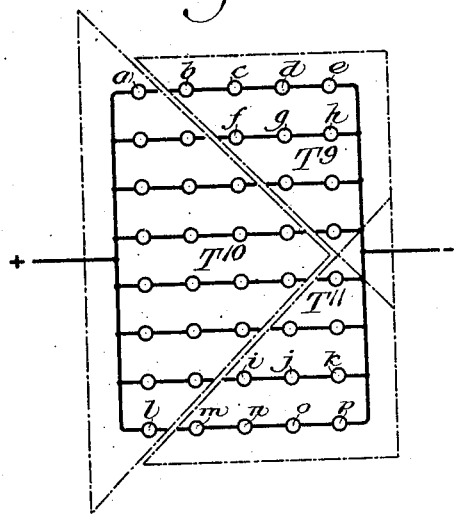
Figs. 12 and 13 are simplified diagrams of another modification.
Figure 13:
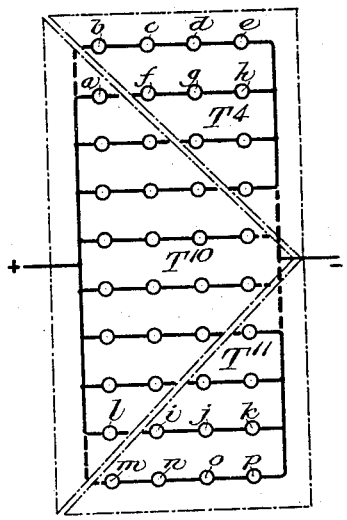

In the modification of my invention illustrated diagrammatically in Figs. 12 and 13, three triangular groups of elements are so associated together that they may be either partially or wholly overlapped. With the groups connected together in partially overlapped fashion as represented in Fig. 12, the sub-group $a$ of group $T_{10}$ is in series with sub-group $b$—$c$—$d$—$e$ of group $T_9$ and sub-group $l$ of group $T_{10}$ is in series with sub-group $m$—$n$—$o$—$p$ of group $T_{11}$. By moving triangle $T_{10}$ to the right between triangles $T_9$ and $T_{11}$, in a wedge like manner, the groups may be wholly overlapped as illustrated in Fig. 13 wherein sub-group $a$ is in series with sub-group $f$—$g$—$h$ and sub-group $l$ is in series with sub-group $i$—$j$—$k$. The system shown in these figures affords a five-eight series-parallel combination and a four-ten series-parallel combination.

Figure 14:
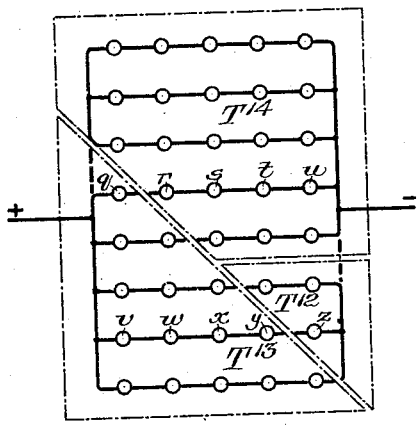
Figs. 14 and 15 illustrate still another form of my invention.
Figure 15:
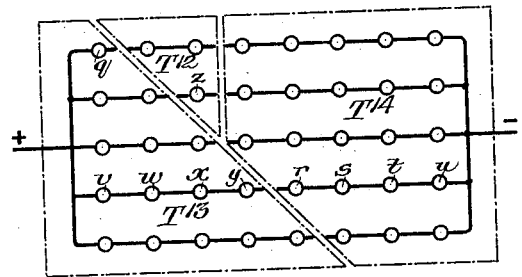

In Figs. 14 and 15 I have illustrated an embodiment of my invention in which there are two triangular groups of elements $T_{12}$ and $T_{13}$ and one group of elements $T_{14}$ which, while tapered, is not of triangular shape but is in the form of a rectangle having one corner removed. When these three groups are connected together as shown in Fig. 14, a five-eight series-parallel combination is obtained with sub-group $q$ of group $T_{13}$ in series with sub-group $r$—$s$—$t$—$u$ of group $T_{14}$, for example, and sub-group $v$—$w$—$x$—$y$ of group $T_{13}$ in series with sub-group $z$ of group $T_{12}$. When the triangular group $T_{12}$ is shifted upward and the group $T_{14}$ is shifted downward, relative to group $T_{13}$, to the respective positions shown in Fig. 15, an eight-five series-parallel combination is afforded.

Thus practically any desired ratios of elements in series to elements in parallel may be obtained by employing suitable combinations of tapered or cuneiform groups of elements.

Any suitable switching means such as a double-throw switch similar to those shown in Figs. 1, 4 and 9 may be employed for shifting the connections in the systems illustrated in Figs. 12 to 15. Furthermore, switches having contacts suitably supported on tapered surfaces sliding one upon another in the manner illustrated diagrammatically in Figs. 2, 3, 5, 6, 7, 8, 10, 11, 12, 13, 14 and 15 may be employed in any embodiment of my invention, that is, by constructing switch contact supports of insulating material shaped as indicated by dot and dash lines in these figures, and having conductors mounted on them so as to project out to the tapered edges and thus to make contact with each other when in alinement, the different series-parallel connections of the cuneiform groups of elements could be effected in the same manner as with a double-throw switch as above described.

It is again noted that two or more parallel elements may be employed in lieu of the single elements in any modification of my invention. Various other modifications will be apparent and the embodiments herein disclosed are to be understood to be merely illustrative of a few of the many forms the invention may take.

From the foregoing it will be understood that by virtue of the unique grouping of elements and the peculiar relative arrangement of the groups, a plurality of series-parallel combinations of any desired proportions may be obtained by means of a minimum number of switching elements and with a minimum number of switching operations.

I claim:

1. An electrical system comprising cuneiform groups of elements and means for variably connecting said groups together, whereby a plurality of series-parallel combinations of all of said elements may be obtained.

2. An electrical system comprising groups of electrical elements connected in subgroups in arithmetical progression, and means for variably connecting said groups together, whereby said elements may be variably combined in series-parallel.

3. An electrical system comprising groups of electrical elements connected in subgroups in arithmetical progression, and a double-throw switch connected with said groups, whereby said elements may be variably connected in rectangular series-parallel combinations.

4. An electrical system comprising a plurality of groups of elements, respective groups being connected in arithmetical progression, and means for variably overlapping said groups to form a plurality of series-parallel combinations of elements.

5. An electrical system comprising a plurality of groups of elements, respective groups being connected in arithmetical progression, and means for variably overlapping said groups to form a plurality of rectangular series-parallel combinations of elements.

6. An electrical system comprising a plurality of elements connected in sub-groups, said sub-groups being connected in groups having a progressively increasing number of elements in at least some of the sub-groups thereof to form different series-parallel combinations of elements.

7. An electrical system comprising a plurality of elements connected in cuneiform groups, a switch, and connections whereby, when said switch is in one position, said groups are overlapped to give one rectangular series-parallel combination and when said switch is in the other position said groups are overlapped to give a different rectangular series-parallel combination.

8. An electrical system comprising a plurality of elements connected in cuneiform groups, a plurality of elements connected in one or more rectangular groups, a switch, and connections whereby when said switch is in one position said cuneiform groups are overlapped and connected with the rectangular group or groups to give one rectangular series-parallel combination, and when said switch is in the other position, said cuneiform groups are overlapped and connected to said rectangular group or groups to give a different rectangular series-parallel combination.

9. An electrical system comprising a plurality of elements connected in triangular groups, a plurality of elements connected in one or more rectangular groups, a switch, and connections whereby when said switch is in one position said triangular groups are partially overlapped and connected in series with the rectangular group or groups to give one rectangular series-parallel combination, and when said switch is in the other position, said triangular groups are overlapped a different extent and connected in parallel to said rectangular group or groups to give a different rectangular series-parallel combination.

10. An electrical system comprising a plurality of elements connected in cuneiform and rectangular groups, and means for variably overlapping said cuneiform groups and for connecting said overlapped cuneiform groups in series or in parallel with the rectangular groups.

11. An electrical system comprising a plurality of battery units, respectively connected in cuneiform and rectangular series-parallel groups, and a switch for variably connecting said groups together, whereby said battery units may be connected in different rectangular series-parallel combinations.

12. An electrical system comprising cuneiform groups of elements and one or more rectangular groups of elements, and a multiple position switch for variably connecting said groups together, whereby a plurality of rectangular series-parallel combinations of said elements may be obtained.

13. An electrical system comprising cuneiform groups of elements, and one or more rectangular groups of elements, and a multiple position switch for variably connecting said groups together, whereby a plurality of series-parallel combinations of said elements may be obtained.

14. An electrical system comprising cuneiform groups of elements, and one or more rectangular groups of elements, and means for variably connecting said groups together, whereby a plurality of series-parallel combinations of said elements may be obtained.

15. An electrical system comprising battery units connected in cuneiform groups and a multiple position switch connected with said groups whereby said battery units may be connected in different rectangular series-parallel combinations.

16. An electrical system comprising secondary battery units connected in cuneiform groups, a source of current, a load circuit, and a multiple position switch, whereby when said switch is in one position said battery units are connected to said source in one rectangular series-parallel combination, and when said switch is in another position said battery units are connected to said circuit in a different rectangular series-parallel combination.

17. An electrical system comprising a working circuit, a generator in parallel therewith, a plurality of secondary battery units connected in sub-groups, said sub-groups being arranged in arithmetical progression into groups, and means for variably connecting said groups together, whereby a plurality of series-parallel combinations of said battery units may be obtained.

18. An electrical system comprising a working circuit, a generator in parallel therewith, a plurality of secondary battery units connected in sub-groups, said sub-groups being connected in arithmetical progression into groups, and a double-throw switch connected with said groups whereby said battery units may be variably connected in rectangular series-parallel combination.

19. An electrical system comprising a working circuit, a generator in parallel therewith, a plurality of secondary battery units connected in sub-groups, said sub-groups being connected in arithmetical progression into groups, and means for variably connecting the sub-groups of respective groups in series.

20. An electrical system comprising a working circuit, a generator in parallel therewith, a plurality of secondary battery units connected in sub-groups, said sub-groups being connected in arithmetical progression into groups, and a multiple position switch for variably connecting the sub-groups of respective groups in series.

Signed by me at Boston, Massachusetts, this fifth day of April, 1916.

NORMAN F. RUTHERFORD.

Copies of this patent may be obtained for five cents each, by addressing the "Commissioner of Patents, Washington, D. C."